US012676497B2

(12) United States Patent
    Mattingly

(10) Patent No.: US 12,676,497 B2
(45) Date of Patent: Jul. 7, 2026

(54) SYSTEMS, METHODS, AND CONVERTERS FOR DISTRIBUTING POWER

(71) Applicant: Cirrus Logic International Semiconductor Ltd., Edinburgh (GB)

(72) Inventor: Douglas Mattingly, Long Island, VA (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/767,027

(22) Filed: Jul. 9, 2024

(65) Prior Publication Data

US 2025/0055309 A1     Feb. 13, 2025

Related U.S. Application Data

(60) Provisional application No. 63/518,261, filed on Aug. 8, 2023.

(51) Int. Cl.
    *H02J 7/00*      (2026.01)
    *H02J 7/70*      (2026.01)
    *H02J 9/06*      (2006.01)
    *H02M 3/07*      (2006.01)
    *H02M 3/158*     (2006.01)
    *H02M 3/335*     (2006.01)

(52) U.S. Cl.
    CPC ................ *H02J 9/061* (2013.01); *H02J 7/70* (2026.01); *H02M 3/07* (2013.01); *H02M 3/1582* (2013.01); *H02M 3/33584* (2013.01)

(58) Field of Classification Search
    CPC ........ H02J 9/061; H02J 7/0042; H02J 7/0068; H02J 7/342; H02J 2207/20; H02M 3/07; H02M 3/1582; H02M 3/33584; H02M 1/0095
    See application file for complete search history.

(56) References Cited

U.S. PATENT DOCUMENTS

| | | | | | |
|---|---|---|---|---|---|
| 2006/0139819 | A1* | 6/2006 | May | ...................... | H02J 7/0068 |
| | | | | | 361/18 |
| 2012/0169304 | A1* | 7/2012 | Isik | ......................... | H02M 3/07 |
| | | | | | 323/266 |
| 2013/0170311 | A1* | 7/2013 | Lai | .......................... | H02J 7/345 |
| | | | | | 365/228 |
| 2022/0052540 | A1* | 2/2022 | Perry | ...................... | G06F 1/263 |

\* cited by examiner

*Primary Examiner* — Elim Ortiz
(74) *Attorney, Agent, or Firm* — Jackson Walker L.L.P.

(57)                ABSTRACT

A system for distributing power between an external power supply, a battery, and a host device, the system comprising: an input terminal for coupling to the external power supply; a battery terminal for coupling to the battery; a first converter selectively coupled between the input terminal, the battery terminal, and a supply rail of the host device; and a second converter selectively coupled between the input terminal, the battery terminal, and the supply rail, the second converter being bidirectional; and control circuitry for controlling power distribution between the external power supply, the battery, and the supply rail via the first and second converters.

23 Claims, 5 Drawing Sheets

900

1000

SYSTEMS, METHODS, AND CONVERTERS FOR DISTRIBUTING POWER

The present disclosure claims priority to U.S. Provisional Patent Application Ser. No. 63/518,261, filed Aug. 8, 2023, which is incorporated by reference herein in its entirety.

TECHNICAL FIELD

The present disclosure relates to power distribution systems and converters, in particular for distributing power in portable electronic devices.

BACKGROUND

For portable electronic devices, such as laptop computers, power distribution systems and provided to control the distribution of power from a power supply to the device for powering the device as well as the charging the device's battery. Conventional distribution systems use a switched power transistor (e.g. FET) to facilitate battery charging in addition to allowing the battery to maintain a system voltage for the device when an external power supply is removed. With increased use of programmable power supplies (PPS) and extended power range (EPR) power supplies, there is a need for improved functionality, efficiency, and head dissipation performance in such power distribution systems.

SUMMARY

According to a first aspect of the disclosure, there is provided a system for distributing power between an external power supply, a battery, and a host device, the system comprising: an input terminal for coupling to the external power supply; a battery terminal for coupling to the battery; a first converter selectively coupled between the input terminal, the battery terminal, and a supply rail of the host device; and a second converter selectively coupled between the input terminal, the battery terminal, and the supply rail, the second converter being bidirectional; and control circuitry for controlling power distribution between the external power supply, the battery, and the supply rail via the first and second converters.

The first converter may comprise an inductive buck-boost converter. The second converter may comprise a switched capacitor voltage regulator.

The second converter may comprise one or more inductors.

The control circuitry may be configured to control the first and second converters in a first mode when the external power supply is coupled to the input terminal in which: the first converter is configured to convert an external supply voltage at the input terminal to a system voltage on the supply rail to supply power to the host device; and the second converter is configured to convert the system voltage to a battery voltage on the battery terminal to charge the battery.

The external supply voltage may be a constant voltage.

The control circuitry may be configured to detect the presence of the external power supply and a type of the external power supply, and switch to the first mode based on the type of external power supply.

The control circuitry may be configured to control the first and second converters in a second mode when the external power supply is coupled to the input terminal in which: the first converter is configured to convert an external supply voltage at the input terminal to a system voltage on the supply rail to supply power to the host device; and the second converter is configured to convert the external supply voltage at the input terminal to a battery voltage at the battery terminal to supply power to the battery.

The control circuitry may be configured to detect the presence of the external power supply and a type of the external power supply, and switch to the second mode based on the type of external power supply.

The external supply voltage may be variable. The control circuitry may be configured to control the external supply voltage via the input terminal.

The external power supply may be disconnected from the input terminal. When a state of charge of the battery exceeds a charge threshold, the control circuitry may be configured to control the first and second converters in a third mode in which: the first converter is idle; and the second converter is configured to convert a battery voltage at the battery terminal to a system voltage on the supply rail to supply power to the host device.

The control circuitry may be configured to detect the absence of the external power supply and the state of charge of the battery exceeding the charge threshold and, in response, switch to the third mode based on the type of external power supply.

When the external power supply is disconnected from the input terminal and a state of charge of the battery is below a charge threshold, the control circuitry may be configured to control the first and second converters in a fourth mode in which: the first converter is configured to convert a battery voltage at the battery terminal to a system voltage on the supply rail to supply power to the host device; and the second converter is idle.

The control circuitry may be configured to detect the absence of the external power supply and the state of charge of the battery is below the charge threshold and, in response, switch to the fourth mode based on the type of external power supply. The charge threshold may be around 20%, or 25%, or 30%.

When the external power supply is coupled to the input terminal and an input power provided to the input terminal is below a power threshold, the control circuitry may be configured to control the first and second converters in a battery assist mode in which: the first converter is configured to convert an external supply voltage at the input terminal to a system voltage on the supply rail to supply power to the host device; and the second converter is configured to convert a battery voltage at the battery terminal to supplement the system voltage on the supply rail to supply power to the host device from the battery.

When the state of charge of the battery falls below a charge threshold, the control circuitry may be configured to switch the first and second converters from the battery assist mode to a battery mode in which: the first converter is configured to convert the battery voltage at the battery terminal to the system voltage on the supply rail to supply power to the host device from the battery; and the second converter is idle.

The input terminal may comprise a USB-C connector.

The system may further comprise a third converter coupled to the supply rail and configured to convert a system voltage on the supply rail to a secondary supply voltage at a secondary supply rail of the host device. The third converter may comprise a switched capacitor voltage regulator.

According to another aspect of the disclosure, there is provided a system for distributing power between an external power supply, a battery, and a host device, the system comprising: an input terminal for coupling to a power supply; an inductive power converter; a switch capacitor power converter; a battery terminal for coupling to a battery; a controller configured to detect a characteristics of the power supply and couple the input terminal to an input of the inductive power converter or an input of the switched capacitor power converter based in the detected characteristic.

On determining that the power supply is a fixed voltage power supply, the controller may be configured to couple the input terminal to the input of the inductive power converter and an output of the inductive power converter to an input of the switched capacitor power converter. The inductive power converter may be configured to output an intermediate voltage at its output. The switched capacitor power converter may be configured to convert the intermediate voltage to a charging voltage at the battery terminal.

On determining that the power supply is a fixed voltage power supply, the controller may be configured to couple the input terminal to the input of the inductive power converter and an output of the inductive power converter to an input of the switched capacitor power converter. The inductive power converter may be configured to output an intermediate voltage at its output, the switched capacitor power converter configured to convert the intermediate voltage to a charging voltage at the battery terminal.

According to another aspect of the disclosure, there is provided a power converter, comprising: a first switch coupled between a first converter node and a first flying capacitor node; a second switch coupled between the first flying capacitor node and a second converter node; a third switch coupled between the second converter node and a second flying capacitor node; a fourth switch coupled between second flying capacitor node and a reference voltage node; a fifth switch coupled between the first flying capacitor node and a third converter node, wherein the first and second flying capacitor nodes are for coupling a first flying capacitor therebetween; wherein the power converter is operable in: a first mode to convert a first input voltage received at the first converter node to a first output voltage at the first output voltage node; and a second mode to convert a second input voltage received at the second input voltage to the first output voltage.

In a third mode, the power converter may be operable to convert a third input voltage received at the first output voltage terminal to a second output voltage at the first input voltage terminal or the second input voltage terminal.

According to another aspect of the disclosure, there is provided a power converter, comprising: first, second, third and fourth switches coupled in series between a first input voltage node and a reference voltage node, the first and second switched coupled at a first flying capacitor node, the second and third switches coupled at a first output voltage node for outputting a first output voltage, the third and fourth switches coupled at a second flying capacitor node, the first and second flying capacitor nodes for coupling a flying capacitor therebetween; and a fifth switch coupled between the first flying capacitor node and a second input voltage node; wherein the power converter is operable in: a first mode to convert a first input voltage received at the first input voltage node to the first output voltage; and a second mode to convert a second input voltage received at the second input voltage to the first output voltage.

According to another aspect of the disclosure, there is provided a buck-boost converter, comprising: a first converter stage comprising the converter described above; a second converter stage comprising the converter described above; and an inductor coupled between the second converter node of the first converter stage and the second converter node of the second converter stage.

According to another aspect of the disclosure, there is provided a system for power delivery and charging of a host device, the system comprising: an input supply terminal, for connecting with an external power supply (e.g. a USB-C charger); a battery terminal, for connecting with a device battery; a first power converter (e.g. 3 L Buck/Boost converter) to receive input power and generate an output power; a second power converter (e.g. SC converter) to receive input power and generate an output power; and an output voltage rail, for providing a system power Vsys, wherein the input supply terminal is connected to the first converter and to the second converter (to selectively provide input power to the converters); wherein the battery terminal is connected to the first converter (to selectively provide input power to the first converter) and to the second converter (a bidirectional connection, to provide input power to the second converter, or to receive an output power from the second converter to charge a connected battery); and wherein the output voltage rail is connected to the first converter (to selectively receive output power from the first converter) and to the second converter (a bidirectional connection, to selectively receive output power from the second converter, or to selectively provide input power to the second converter from the voltage rail).

The system may be operable in a first mode, wherein: the input supply terminal is coupled with the first power converter, to provide input power to the first power converter from an external power supply; the output of the first power converter is coupled with the output voltage rail, to generate the system power Vsys based on the external power supply; the output voltage rail is coupled with the input of the second power converter, to provide input power to the second power converter from the system power Vsys; and the output of the second power converter is coupled with the battery terminal, to charge a coupled battery based on the system power Vsys.

The system may be operable in a second mode, wherein: the input supply terminal is coupled with the first power converter, to provide input power to the first power converter from an external power supply; and the output of the first power converter is coupled with the output voltage rail, to generate the system power Vsys based on the external power supply; wherein the input supply terminal is further coupled with the input of the second power converter, to provide input power to the second power converter from the external power supply; and the output of the second power converter is coupled with the battery terminal, to charge a coupled battery based on the external power supply.

The system may be operable to detect a type of external power supply connected to the input supply terminal, wherein the system is arranged to select between the first and second modes based on the detected external power supply.

The system may operate in the first mode when the external power supply provides a fixed supply voltage, e.g. using a standard USB supply.

The system may operate in the second mode when the external power supply provides a dynamically variable supply voltage, e.g. a USB PPS power supply or a USB EPR power supply.

The system may be operable to detect the absence of an external power supply, and to adjust operation of the system based on the presence or absence of an external power supply.

The system is operable to monitor a characteristic of a coupled battery, e.g. a state-of-charge (SOC) of the coupled battery. The system operation may be controlled based on the monitored characteristic.

The system may be operable in a third mode, wherein: the battery terminal is coupled with the input to the second power converter, to provide input power to the second power converter from a coupled battery; and the output of the second power converter is coupled with the output voltage rail, to generate the system power Vsys based on the coupled battery.

The system may be operable in a fourth mode, wherein: the battery terminal is coupled with the input to the first power converter, to provide input power to the first power converter from a coupled battery; the output of the first power converter is coupled with the output voltage rail, to generate the system power Vsys based on the coupled battery.

When the SOC of the coupled battery is above a threshold level, e.g. above 30% SOC, the system may operate in the third mode.

When SOC of the coupled battery is below a threshold level, e.g. below 30% SOC, the system may operate in the fourth mode.

The system may be operable in a fifth mode, wherein: the input supply terminal is coupled with the first power converter, to provide input power to the first power converter from an external power supply; and the output of the first power converter is coupled with the output voltage rail; wherein the battery terminal is coupled with the input of the second power converter, to provide input power to the second power converter from a coupled battery; and the output of the second power converter is coupled with the output voltage rail, wherein the output of the first and second converters are combined to generate the system power Vsys.

The system may be adapted to operate in the fifth mode if the input power supply is insufficient to provide all the power necessary to run the system, and can be supplemented by the battery supply through the SC converter.

The system may be operable to monitor a characteristic of the battery, e.g. the SOC, and further adjusts operation of the system based on the monitored characteristic. For example, if the SOC falls below a threshold level of say 30%, the system may terminate use of the external power supply and run the battery voltage through the first converter in order to maintain the system power level Vsys.

The system further comprises at least one additional switched capacitor voltage regulator (SCVR) coupled to the output voltage rail to convert the system power Vsys to a suitable voltage level for use by the host device.

According to another aspect there is provided a system and method for power delivery and charging of a host device, the system comprising: an input terminal to receive a power supply; an inductive power converter; a switched capacitor power converter; a battery terminal to couple with a battery to be charged; and a controller, wherein the controller detects a characteristic of a power supply connected to the input terminal, and connects the input terminal to an input to the inductive power converter or to an input to the switched capacitor power converter based on the detected characteristic.

If the power supply provides a fixed supply voltage, the controller may connect the input terminal to the input to the inductive power converter to generate an intermediate voltage, the intermediate voltage provided as input to the switched capacitor power converter to generate a charging voltage at the battery terminal.

The intermediate voltage may be used as a system voltage for the host device.

If the power supply provides a variable supply voltage, the controller may connect the input terminal to the input to the inductive power converter to generate a system voltage for the host device, and the controller may further connect the input terminal to an input of the switched capacitor power converter to generate a charging voltage at the battery terminal.

When in the fifth mode, the system may be operable to monitor a characteristic of the battery, e.g. the SOC, and further adjusts operation of the system based on the monitored characteristic. E.g. if SOC falls below a threshold level of say 30%, the system preferably terminates use of the external power supply and runs the battery voltage through the first converter in order to maintain the system power level Vsys.

The system may further comprise at least one additional switched capacitor voltage regulator (SCVR) coupled to the output voltage rail to convert the system power Vsys to a suitable voltage level for use by the host device.

According to another aspect of the disclosure, there is provided an integrated circuit (or IC) arranged to implement the system and method as described above. The IC may be provided with integrated circuit elements such as inductors or capacitors, or the IC may be arranged to couple with discrete off-chip circuit elements.

According to another aspect of the disclosure, there is provided a host device, e.g. a laptop or a tablet computer comprising the above-described system and method.

According to another aspect of the disclosure, there is provided a power converter to receive an input power and generate an output power, the power converter comprising: first, second, third and fourth switches arranged in series between a first input voltage terminal (e.g. Vsys for a SCReg, Vbat for a 3 L Buck/Boost) and a reference voltage terminal (e.g. GND), the converter arranged to receive a capacitor to be coupled between a first capacitor terminal located between the first and second switches and a second capacitor terminal located between the third and fourth switches, and a first output voltage terminal (e.g. Vbat for a SCReg, via a coupled inductor to Vsys for 3 L Buck/Boost) located between the second and third switches to provide an output voltage based on a received input voltage, wherein a fifth switch is connected between a second input voltage terminal (e.g. V (input) for SCReg, V (input) for 3 L Buck/Boost) and a terminal located between the first and second switches, wherein the power converter is operable in a first mode where an input voltage is received from the first input voltage terminal, and a second mode where an input voltage is received from the second input voltage terminal.

The converter may be a switched capacitor regulator (or SCReg) operable in a reverse direction, receiving an input voltage at the first output voltage terminal and providing an output voltage at the first input voltage terminal.

According to another aspect of the disclosure, there is provided a 3 L buck-boost converter (or 3 L Buck/Boost) comprising first and second power converters as described above, wherein the first output voltage terminals of the first and second power converters are connected via inductors to a Buck-Boost output terminal (e.g. Vsys).

According to another aspect of the disclosure, there is provided an electronic device comprising any one of the systems, the power converters, and the buck-boost converters described above.

The device may comprise one of a mobile computing device, a laptop computer, a tablet computer, a games console, a remote-control device, a home automation controller or a domestic appliance, a toy, a robot, an audio player, a video player, or a mobile telephone, and a smartphone.

Throughout this specification the word "comprise", or variations such as "comprises" or "comprising", will be understood to imply the inclusion of a stated element, integer or step, or group of elements, integers, or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to power distribution systems comprising first and second converters for distributing power between a device, the device's battery, and a power supply external to the device.

For portable electronic devices, such as laptop computers, battery charging and power delivery systems are provided to control the charging of device batteries from external power supplies, via wired or wireless power chargers, as well as to control the delivery of system power from the device battery and/or an external power supply to the device.

Figure 1:
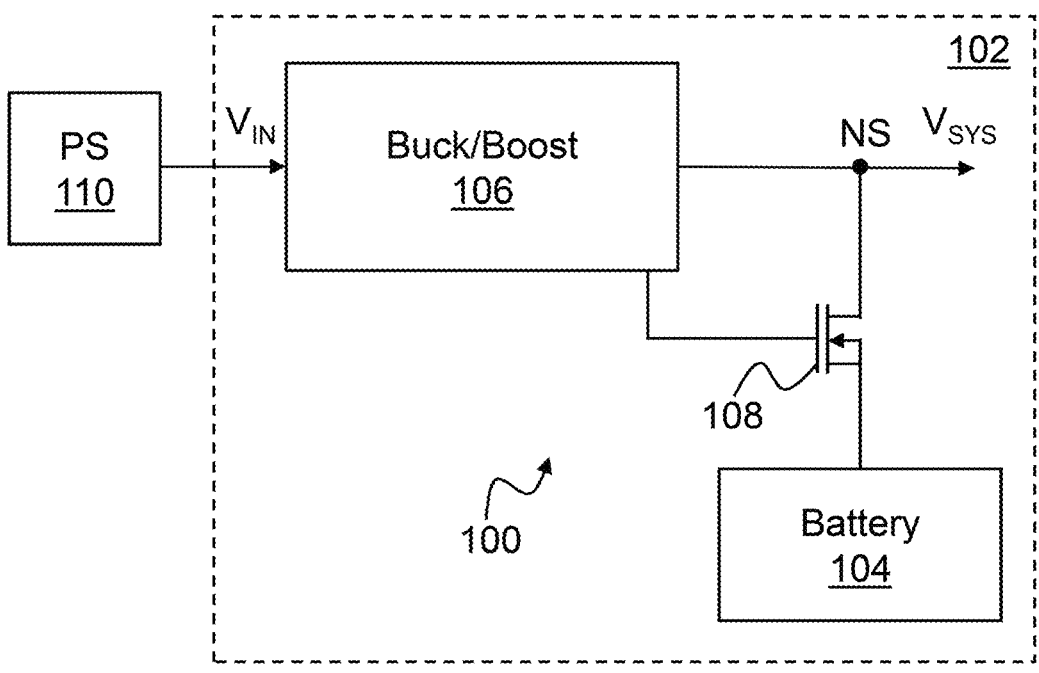
FIGS. 1 and 2 are schematic diagrams of a prior-art power distribution system.

FIG. 1 is a schematic diagram of a known system 100 for distributing power in a portable electronic device 102 comprising a battery 104. The system 100 comprises a buck-boost converter 106 and a switch 108. In this example, the switch 108 is controlled by the buck-boost converter 106 but may alternatively be controlled by a separate controller (not shown).

The buck-boost converter 106 is configured to receive an input voltage Vin from a power supply 110 external to the device 102 and to convert that input voltage to a system voltage Vsys on a system rail NS of the device 102. The battery 104 is also coupled to the system rail NS via the switch 108, which may be a field effect transistor (FET) or similar gated switch device. The buck-boost converter 106 is configured to maintain a substantially constant system voltage Vsys when connected to the power supply 110 whilst also enabling the battery 104 to charge from the system rail NS. When the power supply 110 is disconnected, the battery 104 is controlled to supply the system voltage Vsys to the system rail NS.

Figure 2:
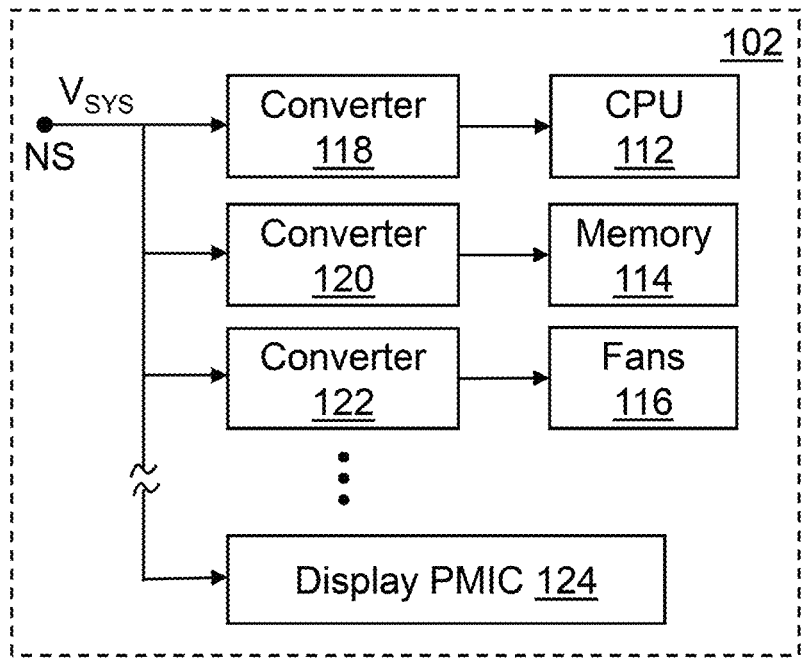

The system rail NS may be coupled to a plurality of downstream device components as shown in FIG. 2. For example, the device 102 may comprise a processor 112, memory 114, fans 116, and a display (not shown), which may all have different power requirements. In this example, each of the processor 112, the memory 114 and the fans 116 are coupled to the system rail NS via respective buck converters 118, 120, 122. Each of the converters 118, 120,

122 may be configured to convert the system voltage Vsys to a different voltage. Typical converters topologies include single or multiphase buck regulators, low-dropout regulators (LDOs). The device 102 may further comprises a power management integrated circuit (PMIC) 124 configured to manage power to the display (not shown). PMICs such as the PMIC 124 shown in FIG. 2 typically comprise a mixture of buck, boost, and linear converters.

With increased use of programmable power supplies (PPS) and extended power range (EPR) power supplies, often via USB power delivery, it is desirable to power distribution systems with improved efficiency and/or heat dissipation performance.

Figure 3:
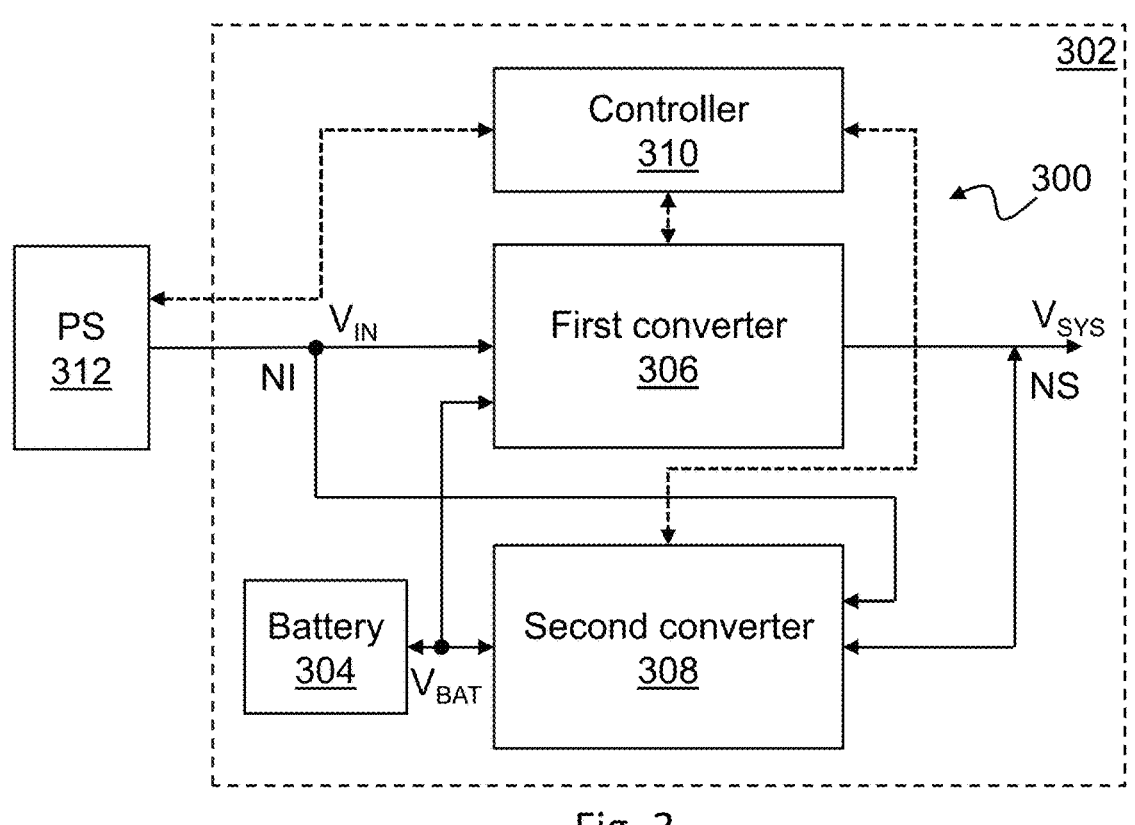
FIG. 3 is a schematic diagram of a power distribution system.

FIG. 3 is a schematic diagram of a system 300 for distributing power in a portable electronic device 302 comprising a battery 304. The system 300 comprises a first converter 306, a second converter 308 and a controller 310. Optionally, the controller 310 may be integrated into the first converter 306.

The first converter 306 and the second converter 308 are each selectively coupled at an input node NI to a power supply 312 external to the device 302 via a suitable interface (e.g. universal serial bus (USB) or USB-C). Thus, when connected, the power supply 312 is configured to provide an input voltage Vin as an input to one or both of the first and second converters 306, 308.

The power supply 312 may be a single fixed voltage power supply or a variable voltage power supply (e.g. having EPR capability). When implemented as a variable power supply, the power supply 312 may be fully adjustable to output any voltage within a range, such as between 15V and 48V at 5 A. Alternatively, the power supply 312 may be adjustable in steps, such as 20V, 28V, 36V and 28V, all at 5 A.

The first converter 306 may be controlled by the controller 310 to convert the input voltage Vin to a system voltage Vsys on a system rail NS of the device 302. The first converter 306 may also be configured to convert a battery voltage Vbat received from the battery 304 to the system voltage Vsys.

The first converter 306 may be implemented as an inductive converter. The first converter 306 may be a buck-boost converter, such as a three-level buck-boost converter. Thus, the first converter may be configured to step up or step down the input voltage Vin to obtain the system voltage Vsys, or directly convert the input voltage to the system voltage Vsys such that Vin=Vsys.

The second converter 308 may be selectively coupled to each of the input node NI, the system rail NS, and the battery 304. The second converter 308 is preferably bidirectional. As such, the second converter 308 may be configured to transfer charge from the system rail NS to the battery 304, for example to charge the battery 304. Additionally, the second converter 308 may be configured to transfer charge in the opposite direction from the battery 304 to the well as from the battery 304 to the system rail NS. In doing so, the second converter 410 converts the battery 304, for example to the system rail NS to maintain the system voltage Vsys when the power supply 312 is disconnected.

The second converter 308 may be implemented as a switched capacitor converter. An advantage of switched capacitor arrangements is their higher power conversion efficiency when compared to inductor-based converters. Thus, the second converter 308 may be more efficient than the first converter 306. The second converter 308 may be configured as a 1:1 converter or a step-down (buck) converter. The second converter 308 may be configurable to operate at any number of buck ratios, such as 6:1, 4:1, 3:1, and/or 2:1.

The controller 310 is configured to communicate with each of the first and second converters 306, 308 to control their operation. Optionally, the controller may also be configured to communicate with the power supply 312, for example to indicate a desired level of the input voltage Vin. Communication links between the controller 310 and each of the first and second converters 306, 308 and the power supply 312 are denoted by dashed lines in FIG. 3.

Thus, the controller 310 may be configured to control the system 300 to operate in one of several modes which will now be described with reference to FIGS. 4 to 8. For clarity, the communication links between the controller 310 shown in FIG. 3 have been omitted from FIGS. 4 to 8.

Figure 4:
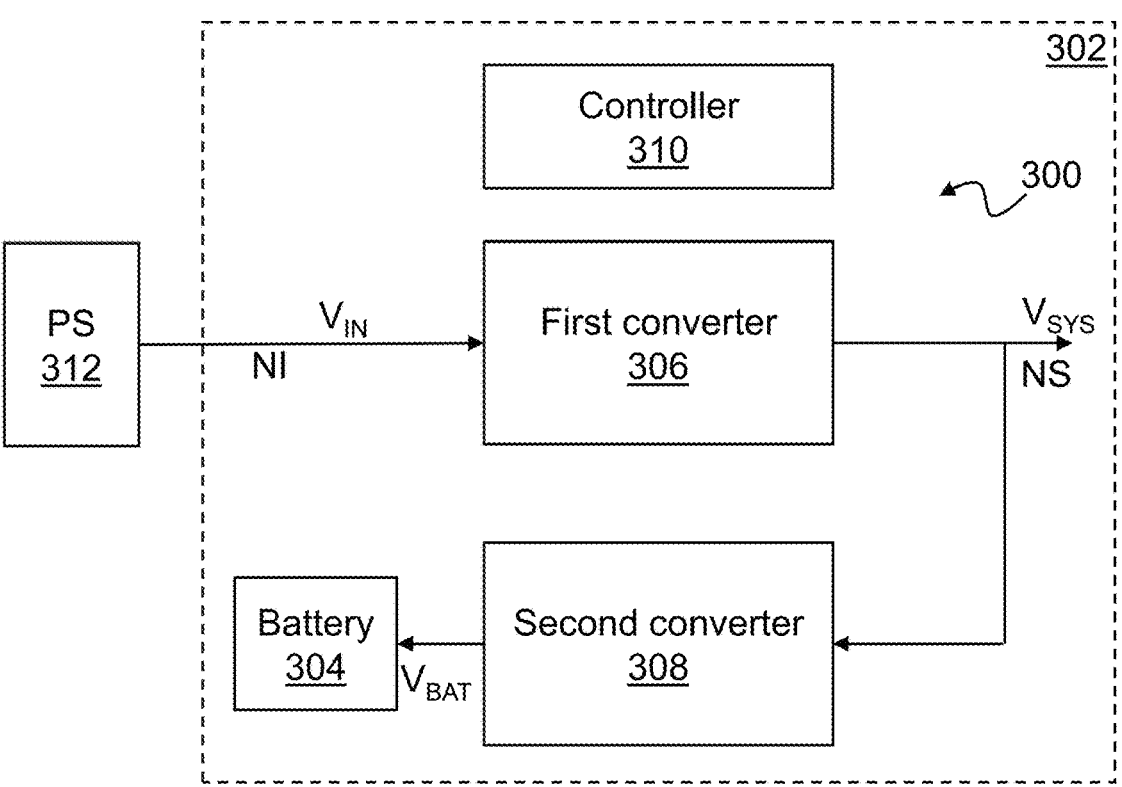
FIGS. 4 to 8 schematically illustrate the power distribution system of FIG. 3 in different modes of operation.

FIG. 4 is a schematic diagram showing a first mode of operation of the system 300. The first mode may, for example, be implemented where an input voltage Vin received at the input node NI is less than or equal to 20V. The first mode may, for example, be implemented when the input voltage Vin is static or fixed.

In the first mode, the system 300 operates to supply power from the power supply 312 to the system rail NS (for supply of power to components of the device 302) and to the battery 304 to charge the battery 304. To do so, the power supply 312 is configured to provide the input voltage Vin to the first converter 306 via the input node NI. The first converter 306 is configured to convert the input voltage Vin to the system voltage Vsys on the system rail NS. The second converter 308 is configured to convert the system voltage Vsys at the system rail NS to the battery voltage Vbat which is provided to the battery 304. Depending on the system voltage Vsys, the second converter 308 may operate in a 1:2, 1:1, or 2:1 conversion mode to convert the system voltage Vsys to provide a suitable battery voltage Vbat.

Figure 5:
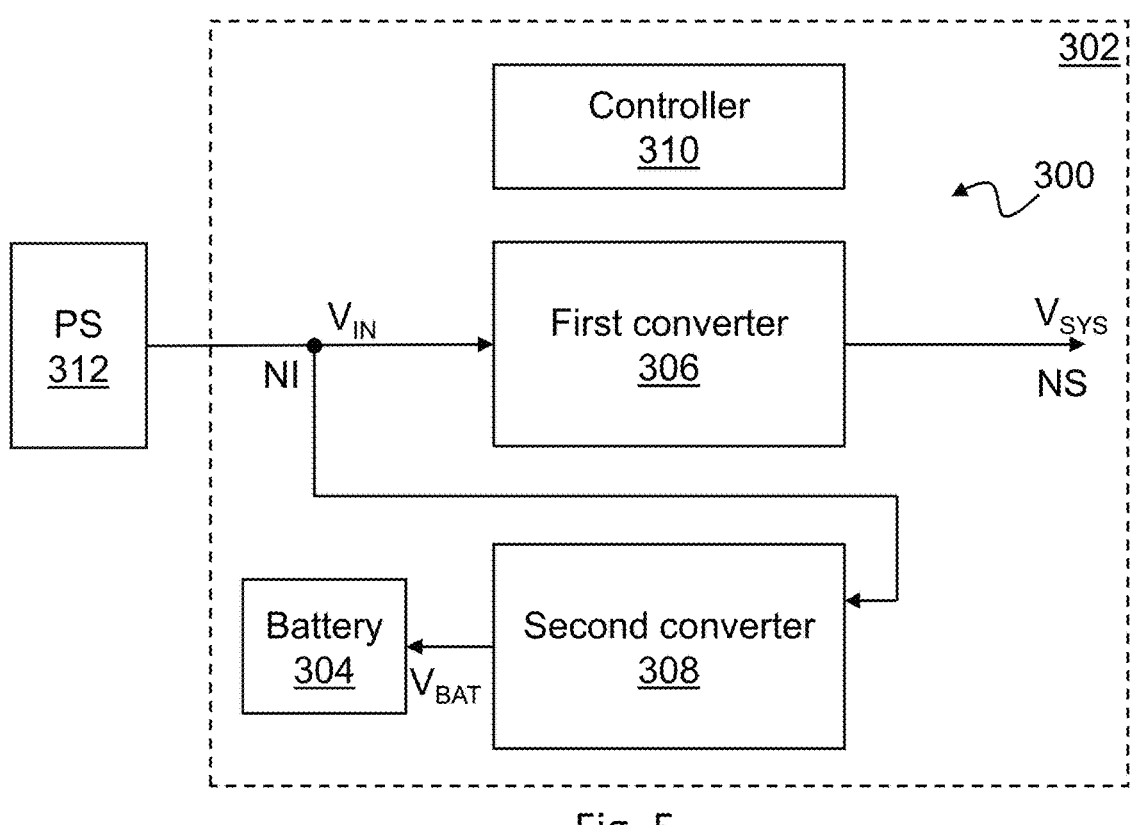

FIG. 5 is a schematic diagram showing a second mode of operation of the system 300. The second mode may, for example, be implemented where the input voltage Vin received at the input node NI is variable. This may be where the power supply 312 is a USB Power Delivery (PD) power supply operable to provide variable power to the input node NI. If the power supply 312 is a programmable power supply, the controller 310 may control the power supply 312 to supply a desired power to the input node.

In this second mode, the second converter 308 is configured to convert the input voltage Vin directly from the input node NI to the battery voltage Vbat for charging the battery 304. The input voltage Vin may be adjusted by the controller 310 to optimize charging of the battery 304. The first converter 306 is configured to convert the input voltage Vin to the system voltage Vsys at the system rail NS, as is the case with the first mode. As such, the first converter 306 is configured to maintain the system voltage Vsys stable in response to fluctuations in the input voltage Vin (which may vary due to charging requirements of the battery Vbat).

Where the first converter 306 is an inductive converter and the second converter 308 is a switched capacitor power supply, by converting the input voltage Vin to the battery voltage Vbat via the second converter 308, power loss associated with charging the battery 304 via the first (e.g. inductive) converter 306 is substantially reduced and less heat is generated within the host device 302.

The following table illustrates values of the system voltage rail Vsys for different ranges of input voltage Vin and different types of battery (2S, 3S, 4S) for an example implementation of the system 300.

| Vsys | Battery | | |
|---|---|---|---|
| Vin | 2S | 3S | 4S |
| <=20 V | 16 V or 8 V | 24 V or 12 V | 32 V or 16 V |
| 15-48 V EPS | 16 V | 24 V | 32 V |

The following table illustrates different configurations of the second converter 308, when implemented as a switched capacitor converter, for different ranges of the input voltage Vin and different battery types (2S, 3S, 4S) for an example implementation of the system.

| Vsys | Battery | | |
|---|---|---|---|
| Vin | 2S | 3S | 4S |
| <=20 V | | Input: Vsys 2:1 or 1:1 | |
| 15-48 V EPS | Input: Vin 2:1 (80 W) 3:1 (120 W) 4:1 (160 W) 6:1 (240 W) | Input: Vin 2:1 (120 W) 4:1 (240 W) | Input: Vin 2:1 (160 W) 3:1 (240 W) |

Figure 6:
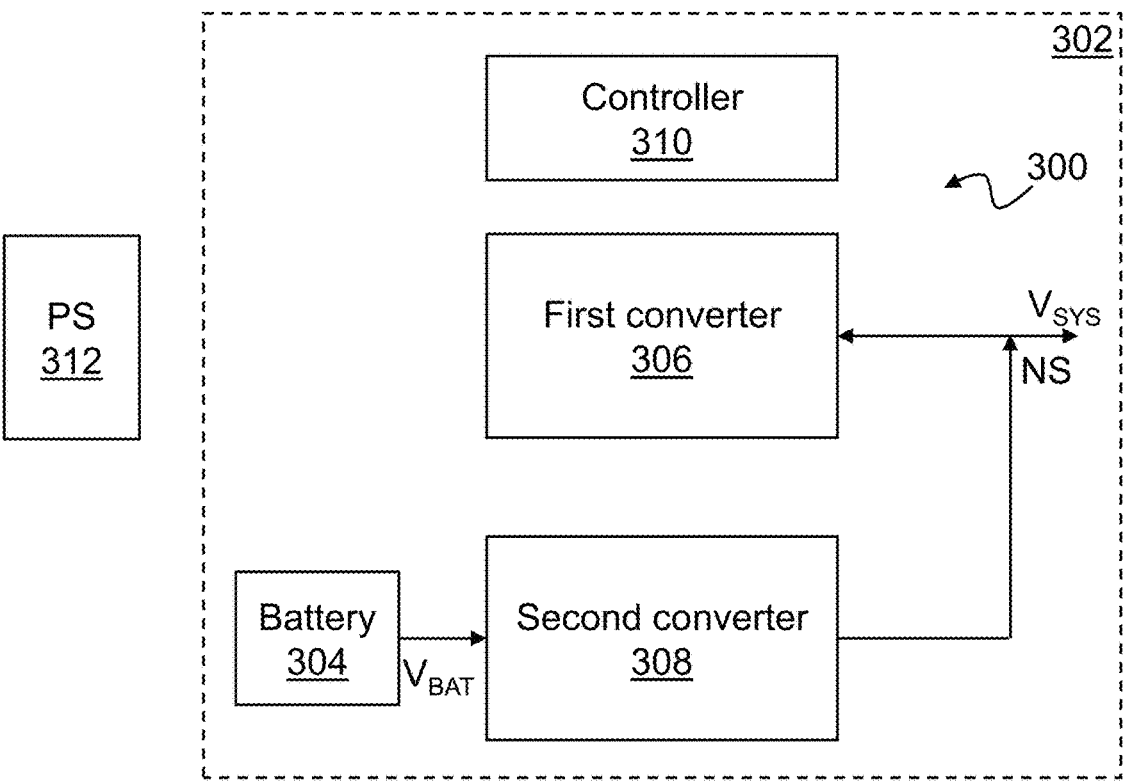
Figure 7:
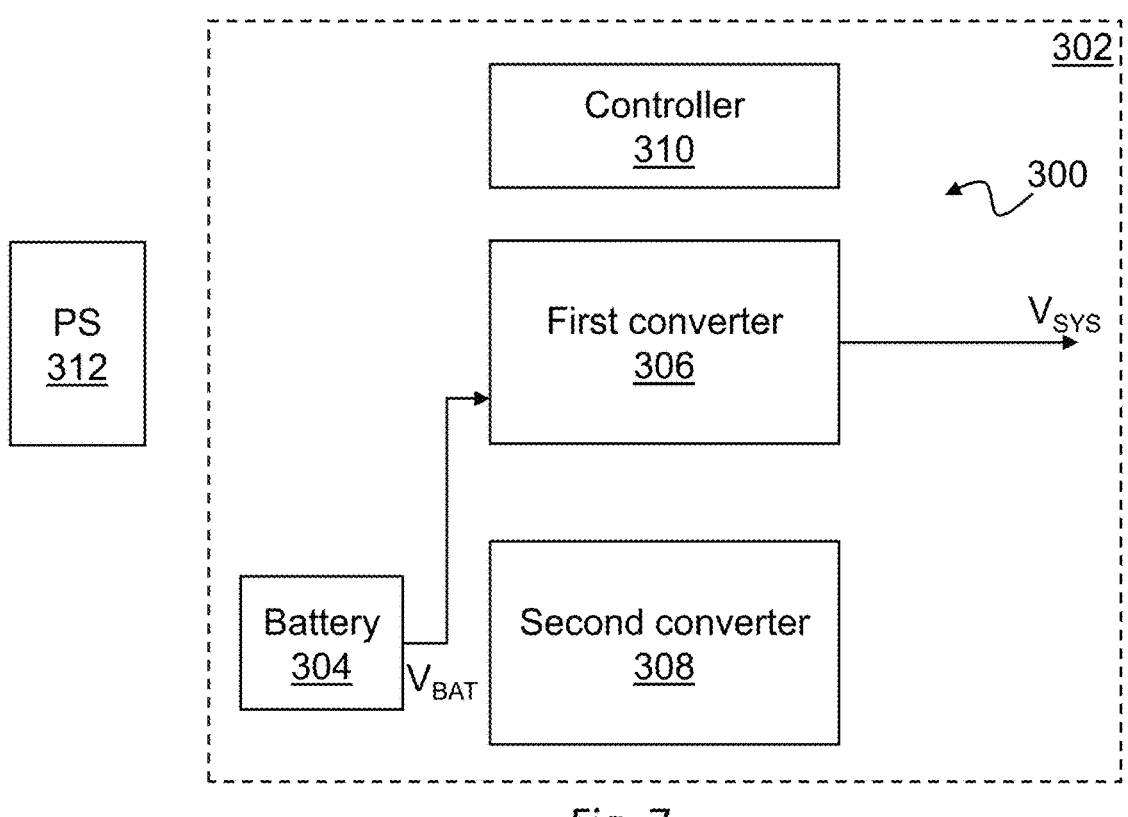

FIGS. 6 and 7 are schematic diagrams showing third and fourth modes of operation of the system 300. These third and fourth modes may be implemented where the power supply 312 is disconnected or otherwise not supplying any power to the input node NI. In such instances, power is supplied to the system rail NS from the battery 304.

FIG. 6 is a schematic diagram showing the third mode of operation. The system 300 may be operated in the third mode when a state of charge (SOC) of the battery is above a threshold charge level, such as 30%.

In the third mode, the system voltage Vsys is maintained via the second converter 308 (e.g. SC converter). The battery voltage Vbat is converted by the second converter to the system voltage Vsys at the system rail NR. Thus, the second converter 308 is converting power in the opposite direction to that of the first and second modes. Where the controller 310 is integrated into the first converter 306, the first converter 306 may pull power from the system rail NS to power the controller 310. Alternatively, the controller 310 may pull power from the system rail NS via one or more other power converters.

FIG. 7 is a schematic diagram showing a fourth mode of operation. The system 300 may be operated in the fourth mode when the state of charge (SOC) of the battery is below a threshold charge level, such as 30%.

When the SOC of the battery falls below this threshold, the second converter 306 (when implemented as an SC converter) may not be able to maintain a constant system voltage Vsys in the third mode. As such, in the fourth mode, the system voltage Vsys is maintained by conversion of the battery voltage Vbat via the first converter 306 (implemented as an inductive converter). This allows the system voltage Vsys to be maintained at a steady level that does not drop as the battery SOC drops, thus avoiding brownouts. The system voltage Vsys can be maintained constant until the SOC of the battery nears zero, at which point the system 300 will shut down.

The system 300 may be operated in a further, fifth, mode. The fifth mode may be implemented where power provided to the input node NI is insufficient to provide the necessary power to run the system 300 and/or device 302. The controller 310 may operate the system 300 using the battery 304 alone, i.e. in the third or fourth modes. Alternatively, the controller 310 may operate the system 300 in the fifth mode in which the input voltage Vin provided by the power supply 312 is supplemented by the battery voltage Vbat.

Figure 8:
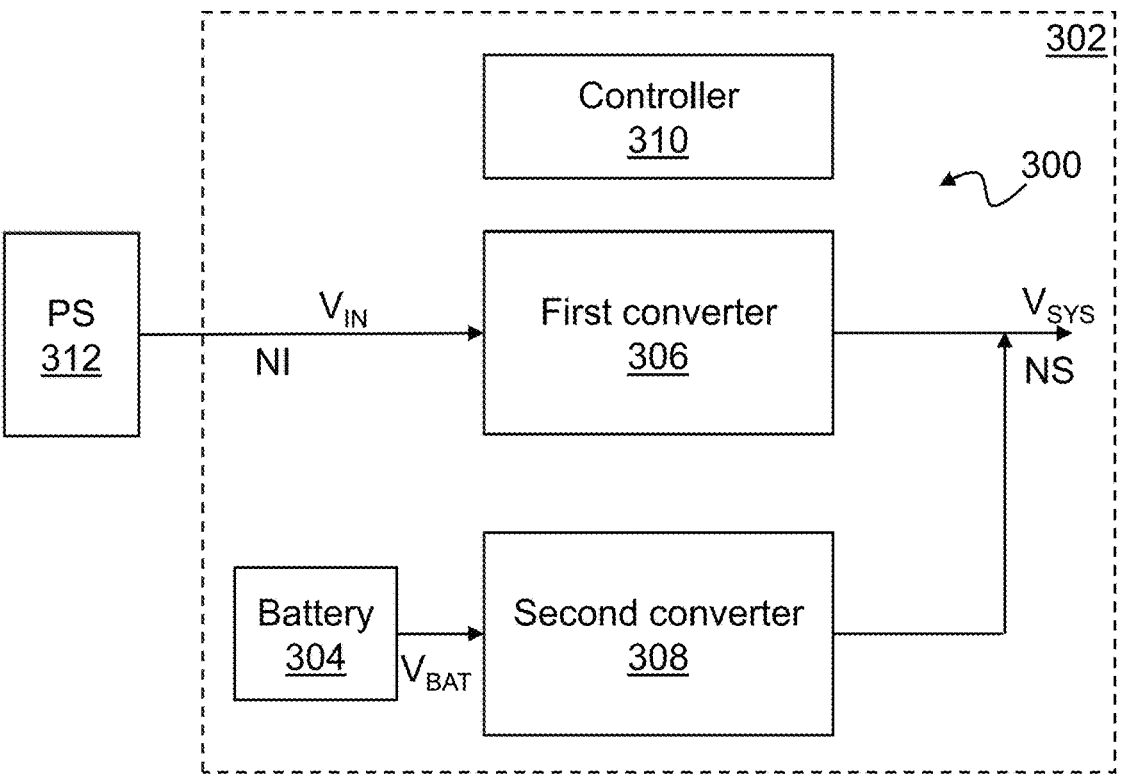

FIG. 8 is a schematic diagram showing the fifth mode of operation of the system 300 (a so-called "battery assist" mode). In the fifth mode, the input voltage Vin is converted by the first converter 306 to a voltage on the system rail NS, in addition to the battery voltage Vbat being converted by the second converter 308 to an additional voltage on the system rail NS, the sum of voltages supplied by the first and second converters 306, 308 make up the system voltage Vsys.

The fifth (battery assist) mode may be operated when the SOC of the battery 304 is above a threshold (such as that described above, say 30%). Once the SOC of the battery 304 falls below that threshold, the controller 310 may control the system to terminate use of the input voltage Vin from the power supply 312, switching to the fourth mode in which the battery voltage Vbat is converted to the system voltage Vsys using the first converter 306 (implemented, for example, as an inductive converter).

As noted above, the first converter 306 may be implemented as a three-level buck-boost converter. Additionally, or alternatively, the second converter 308 may be implemented as a switched capacitor converter.

Figure 9:
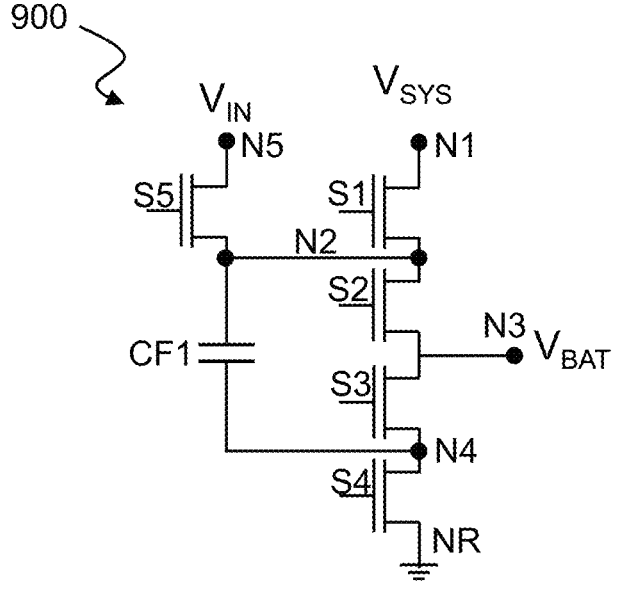
FIG. 9 is a schematic diagram of a switched capacitor power converter.

FIG. 9 is a schematic diagram of a switched capacitor (SC) converter 900 which is an example implementation of the second converter 308.

The SC converter 900 comprises first, second, third, fourth and fifth switches S1, S2, S3, S4, S5, and a first flying capacitor CF1. The first, second, third and fourth switches S1:S4 are coupled in series between a first node N1 and a reference voltage node NR. As such, the first switch S1 is coupled to the second switch S2 at a second node N2, the second switch S2 is coupled to the third switch S3 at a third node N3, and the third switch S3 is coupled to the fourth switch S4 at a fourth node N4. The fifth switch S5 is coupled between a fifth node N5 and the second node N2. The flying capacitor CF1 is coupled between the second node N2 and the fourth node N4.

Each of the switches S1:S5 are controllable to control the transfer of charge around the converter 900. The switches S1:S5 may be implemented as a field effect transistor (FET). The SC converter 900 may be provided as integrated components on an integrated circuit comprising the switches S1:S5 or may be provided as discrete components to be coupled with an integrated circuit comprising the switches S1:S5.

When the SC converter 900 is implemented as the second converter 308, the first node N1 may be coupled to the system rail NS, the third node N3 may be coupled to the battery 304, and the fifth node N5 may be coupled to the input node NI. The SC converter 900 may thus be controllable by the controller 310 to transfer charge between the input node NI and each of the system rail NS and the battery 304, as well as from the battery 304 to the system rail NS.

By providing the fifth switch S5 in addition to the first switch S1, two input rails are provided, one to the fifth node N5 and another to the first node N1. Thus, the first and fifth switches N1, N5 can be controlled to determine which of the first and fifth nodes N1, N5 is the input (or output) of the SC converter 900 (depending on the direction of charge transfer). For example, when the SC converter 900 is implemented as the second converter 308 and the input voltage VIN is to be converted to the battery voltage Vbat, the first switch N1 may be switched off whilst the fifth switch S5 is switched according to a switching regime for charge transfer from the fifth node N5 to the third node N3. Conversely, to convert the system voltage Vsys to the battery voltage Vbat, the fifth switch S5 may be switched off whilst the first switch S1 is switched according to a switching regime for charge transfer from the first node N1 to the third node N3.

Optionally, an additional switch (not shown) may be coupled to the fifth node N5. This may be particularly useful when the SC converter 900 is implemented as the second converter 308 and the system 300 is being operated in the third or fourth modes in which the system voltage Vsys is being maintained from the battery 304 through the second converter 308. The additional switch may be switched off to block current from entering the input voltage rail (node N5) during these modes of operation. The additional switch may be a FET.

Figure 10:
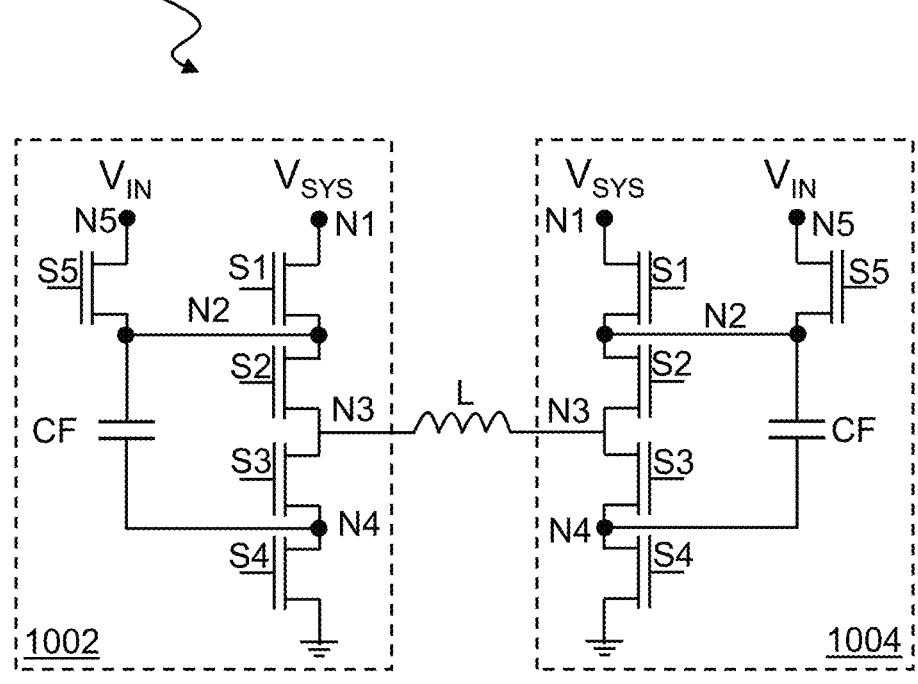
FIG. 10 is a schematic diagram of a three-level buck-boost power converter.

FIG. 10 is a schematic diagram of a three-level inductive buck-boost converter 1000 which is an example implementation of the first converter 306.

The converter 1000 comprises a first SC network 1002, a second SC network 1004, and an inductor L. Each of the first and second SC networks 1002, 1004 comprises a structure substantially identical to the SC converter 900 shown in FIG. 9. As such, like reference numerals have been provided for respective switches S1:S5 in the first and second SC networks 1002, 1004 as those which have been provided for the SC converter 900. The inductor L is coupled between respective third nodes N3 of the first and second SC networks 1002, 1004.

Like the SC converter 900 of FIG. 9, the converter 1000 may be provided as integrated components on an integrated circuit comprising respective switches S1:S5 of the first and second SC networks 1002, 1004 or may be provided as discrete components to be coupled with an integrated circuit.

Each of the SC converter 900, and the first and second SC networks 1002, 1004 are provided with two input rails (nodes N1 and N5).

Embodiments of the present disclosure provide several advantages over prior art power distribution systems. Firstly, the system 300 is compatible with a large range of power standards, such as the newer USB PD Rev 3.1, in addition to earlier static power standards. Additionally, through effective utilization of different converter types, such as using an inductive three-level buck-boost topology for the first converter 306 and a switched capacitor topology for the second converter 308, the efficiency of the system 300 can be improved. Additionally, the use of the system 300 may result in lower heat generation within the device 302; operations that produce heat can be "outsourced" to the power supply 312 external to the device 302. Additionally, by effectively controlling charging and discharging of the battery 304, battery life can be extended whilst providing optimum or near optimum system performance throughout the entire battery charge cycle (voltage range).

The circuitry following the sensor may contain a gain stage amplifier to amplify, or possibly attenuate, the sensor output signal so as to match the sensor output signal range to the input signal range of the circuitry following the sensor, for example, to span a greater range or even the full input range of an ADC. The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A system for distributing power between an external power supply, a battery, and a host device, the system comprising:
an input terminal for coupling to the external power supply;
a battery terminal for coupling to the battery;
a first converter selectively coupled between the input terminal, the battery terminal, and a supply rail of the host device; and
a second converter selectively coupled between the input terminal, the battery terminal, and the supply rail, the second converter being bidirectional; and
control circuitry for controlling power distribution between the external power supply, the battery, and the supply rail via the first and second converters;
wherein the control circuitry is configured to control the first and second converters in a first mode when the external power supply is coupled to the input terminal in which:
the first converter is configured to convert an external supply voltage at the input terminal to a system voltage on the supply rail to supply power to the host device; and
the second converter is configured to convert the external supply voltage at the input terminal to a battery voltage at the battery terminal to supply power to the battery.

2. The system of claim 1, wherein the first converter comprises an inductive buck-boost converter.

3. The system of claim 1, wherein the second converter comprises a switched capacitor voltage regulator.

4. The system of claim 3, wherein the second converter comprises one or more inductors.

5. The system of claim 1, wherein the control circuitry is configured to control the first and second converters in a second mode when the external power supply is coupled to the input terminal in which:

the first converter is configured to convert the external supply voltage at the input terminal to the system voltage on the supply rail to supply power to the host device; and the second converter is configured to convert the system voltage to the battery voltage on the battery terminal to charge the battery.

6. The system of claim 5, wherein the external supply voltage is a constant voltage.

7. The system of claim 5, wherein the control circuitry is configured to detect the presence of the external power supply and a type of the external power supply, and switch to the second mode based on the type of external power supply.

8. The system of claim 1, wherein the control circuitry is configured to detect the presence of the external power supply and a type of the external power supply, and switch to the first mode based on the type of external power supply.

9. The system of claim 1, wherein the external supply voltage is variable, wherein the control circuitry is configured to control the external supply voltage via the input terminal.

10. The system of claim 1, wherein, when the external power supply is disconnected from the input terminal and when a state of charge of the battery exceeds a charge threshold, the control circuitry is configured to control the first and second converters in a third mode in which:

the first converter is idle; and the second converter is configured to convert the battery voltage at the battery terminal to the system voltage on the supply rail to supply power to the host device.

11. The system of claim 10, wherein the control circuitry is configured to detect the absence of the external power supply and the state of charge of the battery exceeding the charge threshold and, in response, switch to the third mode based on the type of external power supply.

12. The system of claim 1, wherein, when the external power supply is disconnected from the input terminal and a state of charge of the battery is below a charge threshold, the control circuitry is configured to control the first and second converters in a fourth mode in which:

the first converter is configured to convert the battery voltage at the battery terminal to the system voltage on the supply rail to supply power to the host device; and the second converter is idle.

13. The system of claim 12, wherein the control circuitry is configured to detect the absence of the external power supply and the state of charge of the battery is below the charge threshold and, in response, switch to the fourth mode based on the type of external power supply.

14. The system of claim 8, wherein a charge threshold is 30%.

15. The system of claim 1, wherein, when the external power supply is coupled to the input terminal and an input power provided to the input terminal is below a power threshold, the control circuitry is configured to control the first and second converters in a battery assist mode in which:

the first converter is configured to convert the external supply voltage at the input terminal to the system voltage on the supply rail to supply power to the host device; and the second converter is configured to convert the battery voltage at the battery terminal to supplement the system voltage on the supply rail to supply power to the host device from the battery.

16. The system of claim 15, wherein when state of charge of the battery falls below a charge threshold, the control circuitry is configured to switch the first and second converters from the battery assist mode to a battery mode in which:

the first converter is configured to convert the battery voltage at the battery terminal to the system voltage on the supply rail to supply power to the host device from the battery; and the second converter is idle.

17. The system of claim 1, wherein the input terminal comprises a USB-C connector.

18. The system of claim 1, further comprising:

a third converter coupled to the supply rail and configured to convert the system voltage on the supply rail to a secondary supply voltage at a secondary supply rail of the host device, wherein the third converter comprises a switched capacitor voltage regulator.

19. A system for distributing power between an external power supply, a battery, and a host device, the system comprising:

an input terminal for coupling to a power supply;

an inductive power converter;

a switch capacitor power converter;

a battery terminal for coupling to a battery;

a controller configured to detect a characteristics of the power supply and couple the input terminal to an input of the inductive power converter or an input of the switched capacitor power converter based on the detected characteristic, wherein the controller is configured to control the inductive power converter and the switch capacitor power converter when the power supply is coupled to the input terminal such that:

the inductive power converter is configured to convert an external supply voltage at the input terminal to a system voltage on a supply rail to supply power to the host device; and the switch capacitor power converter is configured to convert the external supply voltage at the input terminal to a charging voltage at the battery terminal to supply power to the battery.

20. The system of claim 19, wherein on determining that the power supply is a fixed voltage power supply, the controller is configured to couple the input terminal to the input of the inductive power converter and an output of the inductive power converter to an input of the switched capacitor power converter, the inductive power converter configured to output an intermediate voltage at its output, the switched capacitor power converter configured convert the intermediate voltage to the charging voltage at the battery terminal.

21. The system of claim 19, wherein on determining that the power supply is a fixed voltage power supply, the controller is configured to couple the input terminal to the input of the inductive power converter and an output of the inductive power converter to an input of the switched capacitor power converter, the inductive power converter configured to output an intermediate voltage at its output, the switched capacitor power converter configured convert the intermediate voltage to the charging voltage at the battery terminal.

22. An electronic device comprising system of claim 1.

23. The electronic device of claim 22, wherein the device comprises one of a mobile computing device, a laptop computer, a tablet computer, a games console, a remote control device, a home automation controller or a domestic appliance, a toy, a robot, an audio player, a video player, or a mobile telephone, and a smartphone.

\* \* \* \* \*